Feb. 22, 1955
A. A. KOTTMANN
2,702,572
CAKE SLICING MACHINE
Filed April 10, 1951
3 Sheets-Sheet 1
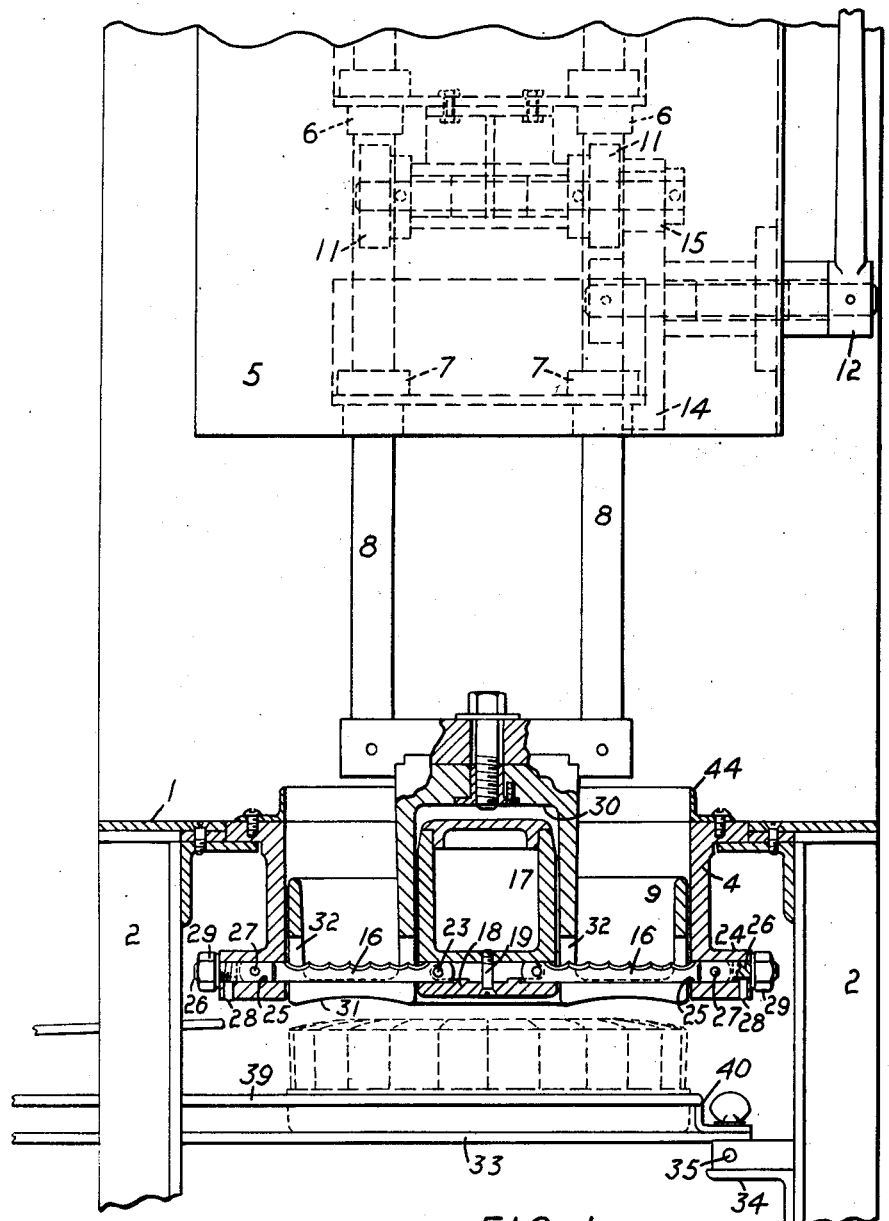
FIG. 1
FIG. 4
INVENTOR.
Arthur A. Kottmann
BY
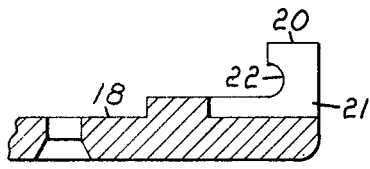

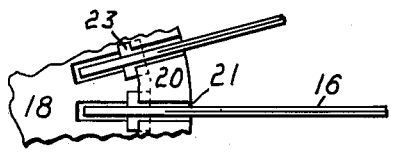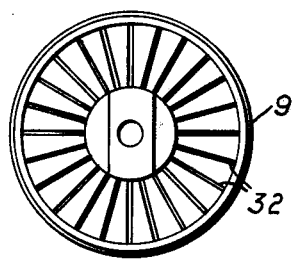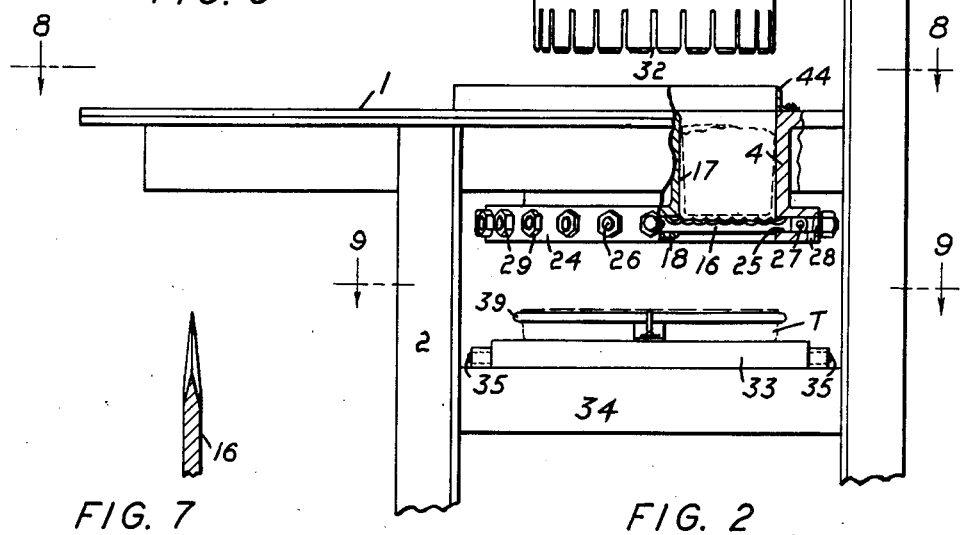

INVENTOR.
Arthur A. Kottmann
BY Evans & McCoy

United States Patent Office 2,702,572
Patented Feb. 22, 1955

2,702,572
CAKE SLICING MACHINE

Arthur A. Kottmann, Davenport, Iowa, assignor, by mesne assignments, to Bettendorf Bakery Equipment Company, Bettendorf, Iowa, a corporation of Iowa Application April 10, 1951, Serial No. 220,213

4 Claims. (Cl. 146—169)

This invention relates to slicers and more particularly to slicers for cakes of the fruit cake type.

In the slicer of the present invention a cake receiving well is provided within which the cake fits and within which a series of spaced slicing cutters are mounted through which the cake is pressed by a plunger, the plunger preferably being provided with a cake engaging face that is provided with spaced slots to receive the cutters so that the cake is pushed by the plunger entirely through the slicing cutters.

The cake receiving well is preferably disposed over a suitable support for a cake tray into which the sliced cake drops as it is freed from the slicing cutters. The cake tray support may also serve as a bagging device by providing the outer end thereof with a bag holder upon which a bag may be supported in position to receive the tray and cake.

An important feature of the invention is to reduce crumbing by providing slicing cutters which enter the cake at the bottom and move through the cake toward the top thereof while the cake is confined circumferentially and pressed against the cutters by means of a plunger which conforms substantially to the top face of the cake.

Reference should be had to the accompanying drawings forming a part of this specification in which:

Figure 1 is a front elevation of a slicing machine embodying the invention, the cake receiving well and the plunger which operates in the well being shown in central vertical section;

Fig. 2 is a side elevation of the machine, a portion of the housing being broken away to show the plunger actuating mechanism;

Fig. 3 is a fragmentary plan view showing the connection between one of the cutter blades and the central plate anchoring cap;

Fig. 4 is a fragmentary radial section through a peripheral portion of the blade anchoring cap;

Fig. 5 is a plan view of the plunger;

Fig. 6 is a fragmentary side elevation of a slicer blade;

Fig. 7 is a transverse section through a slicer blade;

Figure 8:
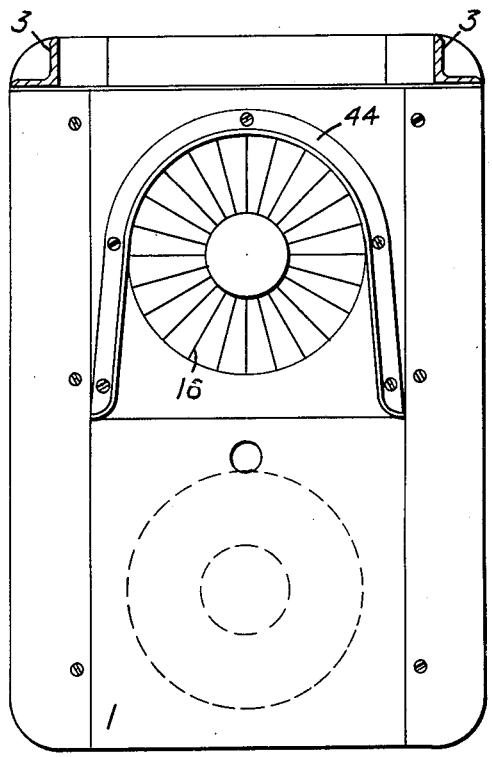
Fig. 8 is a plan view of the cake receiving table viewed as indicated at 8—8 in Fig. 2.

The machine of the present invention has a frame comprising a table 1 supported on front supporting legs 2 and rear standards 3 which project above the table. Between the front legs 2 and rear standards 3 the table has a cake receiving well that has a peripheral wall 4 which conforms substantially to the periphery of a cake to be sliced. The standards 3 support a housing 5 directly above the table well and within the housing 5 pairs of vertically alined guides 6 and 7 are mounted which slidably receive vertical plunger rods 8 that carry a plunger 9 at their lower end. The plunger 9 is mounted concentrically with the peripheral wall 4 of the cake receiving well and the plunger 9 is formed to substantially fit within the wall 4. The rods 8 have rack portions 10 which are engaged by pinions 11. The pinions 11 are actuated to raise and lower the plunger by means of a lever 12 attached to a shaft 13 journaled in the housing 5. The pinions 11 are driven from the shaft 13 through a large gear 14 on the shaft 13 and a small gear 15 that turns with the pinions 11. The lever 12 swings through substantially a quarter turn and serves to move the plunger 9 from a position above the table 1 where it will clear a cake on the table 1, to a lowermost position within the well 4.

The well 4 is provided with a cake supporting bottom that is formed by a series of cutters 16 through which the cake is forced by the plunger 9. The cutters 16 may be formed of cutter band stock having sharpened scalloped cutting edges such as commonly employed on the cutter bands of bread slicing machines, the side faces of the points between successive scallops preferably being ground to remove the ridges between the scallops. The short cutter blades 16 may be made from broken cutter bands or from odd lengths of stock left over from the manufacture of such bands. The arrangement and spacing of the blades determines the shape and thickness of the slices.

In the accompanying drawings a machine is disclosed for cutting a round cake with a central opening, and in order to cut sector shaped slices, the cutters 16 are radially disposed, being attached at their outer ends to the peripheral wall 4 of the well and at their inner ends to a center post 17 which substantially fits within the center opening of the cake. The inner ends of the blades 16 are attached to the center post by means of an anchoring cap 18 that is attached to the lower end of the post 17 by means of a central screw 19. The cap 18 has a peripheral flange 20 that engages the bottom of the post 17 and the flange 20 is provided with radial blade receiving slots 21. The flange 20 has an undercut inner face 22 that receives pins 23 attached to the inner end portions of the cutter blades 16.

The peripheral wall 4 of the well has an outwardly projecting flange 24 at its lower edge which is provided with radial bores 25 in which screws 26 are slidably mounted. The inner ends of the screws 26 are attached to the blades 16 by means of pins or rivets 27 and the screws 26 are held against turning movements in the bores 25 by means of splines 28. Each of the screws 26 is provided with a nut 29 that bears against the edge of the flange 24 and that can be turned to radially adjust the screw 26 and apply tension to the flexible blades 16. The post 17 is supported solely by the tensioned cutter blades 16.

The plunger 9 is provided with a central recess 30 to receive the post 17 and has a concave bottom face 31 which is shaped to substantially conform to the top surface of the cake to be sliced. The bottom portion of the plunger 9 is provided with radial slots 32 which are angularly spaced to receive the blades 16, the slots 32 being of a depth greater than that of the blades 16 so that the plunger can move downwardly to a position where its bottom face 31 is entirely below the cutter blades 16.

The engagement of the bottom face of the plunger with the top of the cake serves to permit the cutting blades 16 to enter the softest and most symmetrical surfaces first and cut the top crust last. Such a procedure prevents excessive crumbling of the crust or the possibility of any glazed crust particles being forced into the body of the cake.

The plunger 9 is accurately guided and is held by its guides against any appreciable lateral or angular movement so that the slots 32 may be quite narrow, providing only a slight clearance for the blades 16.

While the machine illustrated is designed to cut round cakes, it will be apparent that the machine may be readily adapted to cut cakes of various shapes and sizes.

Beneath the cutters 16 means is provided for locating a tray in position to receive a sliced cake. The tray support is in the form of a flat plate 33 that is supported at its inner end on a cross bar 34 attached to the inner sides of a leg 2 and standard 3 at one side of the machine. The plate 33 provides not only a support for the cake tray, but also a runway from which the tray containing the cake may be discharged. To facilitate the discharge of the tray and cake, the supporting member 33 is connected to the bracket 34 by horizontal pivots 35 about which the support may swing to a downwardly inclined position to discharge the tray and cake. The tray support is normally held in horizontal cake receiving position by means of coil springs 36 which are connected to the frame and to the tray support, which exert an upward thrust on the support and normally hold it in horizontal position where it engages with stops 37 that limit its upward movement, one of the spring connections being adjustable to enable the spring tension to be varied for cakes of different weights.

The tray support and discharge runway may also serve as part of a packaging device, in which case it is provided at its discharge end with yieldable bag spreading and holding means which supports a bag in position to receive the cake through its open end.

Figure 9:
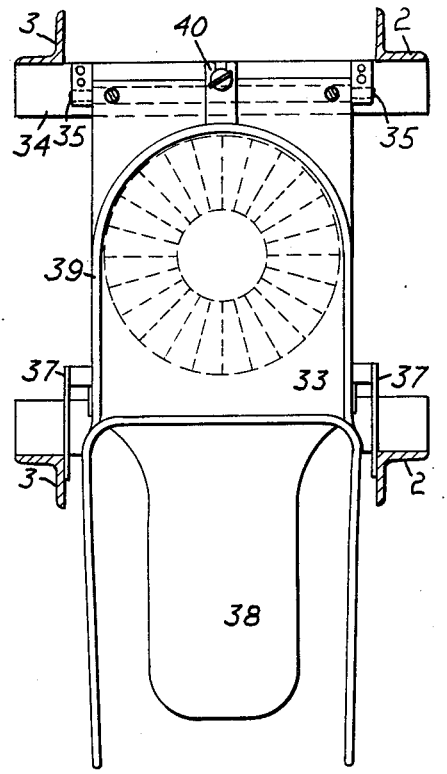
Fig. 9 is a horizontal section taken on the line indicated at 9—9 in Fig. 2.
Figure 10:
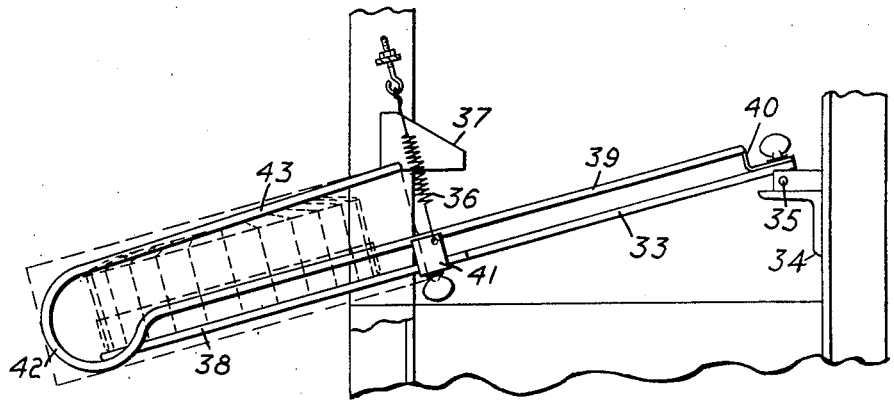
Fig. 10 is a fragmentary view showing the cake receiving and bagging attachment in side elevation.

As shown in Figs. 9 and 10, the support 33 has a narrow extension 38 projecting beyond a side of the machine frame and attached to the support 33 there is a tray guide formed of a resilient rod or wire having spaced side portions 39 extending along opposite sides of the support beneath the table 1, the tray guide being secured to the support 33 by suitable means such as brackets 40 and 41. A short distance beyond the outer end of the projecting portion 38 of the support, the guides have curved bag entering portions 42 which extend downwardly below the extension 38 and upwardly a distance greater than the height of the cake. The guide member has a free end portion 43 extending inwardly at a small inclination to the plate 33 and providing a yieldable member for engagement with the interior of the bag to stretch or tension the open end thereof and provide an opening into which the tray and cake may slide, the bag being supported in cake receiving position as shown in Fig. 10. The combined tray guide and bag holder is preferably formed of a single piece of wire or rod bent to U-shape to provide the side guide portions 39 and the portions 39 are bent back upon themselves to provide the free end portions 43. The side portions 39 are laterally flexible and may be pushed inwardly to facilitate the entry of the end portions 42 into the bag.

In the operation of the machine the operator places a cake on the table 1 and slides it rearwardly to a position where it can drop into the cake receiving well. To facilitate the entry of the cake into the well a U-shaped guide member 44 is provided, the guide member 44 having a central portion curved to conform to the peripheral wall 4 of the well and the ends thereof being disposed divergently to facilitate the entry of the cake therebetween. After the cake has been deposited in the well with its bottom resting upon the cutters 16, the lever 12 is actuated to depress the plunger into engagement with the top of the cake and push the cake through the cutter blades and into the tray T on the support 33. The bottom face of the plunger 9 engages the top face of the cake substantially throughout the extent thereof to minimize the breaking or crumbling of the crust by the knives 16, the sharp edges of which penetrate the crust along the very narrow areas thereof which register with the slots 32 of the plunger.

A bag of paper, cellophane or the like is preferably placed upon the bag holding portion 43 prior to the slicing operation, so that the sliced cake can be immediately placed in the bag after slicing by tilting the tray support 33. Preferably the strength of the spring 36 may be such that the support 33 will automatically swivel down under the weight of the cake.

It is to be understood that variations and modifications of the specific devices herein shown and described for purposes of illustration, may be made without departing from the spirit of the invention.

What I claim is:

1. A cake cutter comprising a structure formed to provide a cake receiving well having an upright peripheral wall, a series of spaced slicing cutters projecting inwardly from said wall and forming a cake supporting bottom in said well, a plunger for forcing a cake through said cutters movable relative to said structure downwardly into and upwardly out of said well, said plunger having a cake engaging bottom face provided with slots to receive said cutters, a tray runway positioned with its inner end beneath said cutters and mounted to swing about a horizontal axis adjacent its rear end, a spring yieldably supporting the outer end of said runway, and a stop limiting upward movement of said runway against which the said runway is normally held by said spring in substantially horizontal cake receiving position, said runway being depressible to an inclined cake discharging position.

2. A cake cutter comprising a structure formed to provide a cake receiving well, a series of spaced slicing cutters forming a cake supporting bottom in said well, a plunger movable relative to said structure downwardly into and upwardly out of said well, said plunger having a cake engaging bottom face provided with slots to receive said cutters, a tray runway positioned with its inner end beneath said cutters and mounted to swing about a horizontal axis adjacent its rear end, means to hold said runway in a horizontal cake receiving position, and bag holding means at the discharge end of said runway for supporting a bag in cake receiving position, said runway being tiltable about said axis to an inclined cake discharging position so as to direct the cake into a bag.

3. A slicer for a cake that has a convex upper surface formed by a hard crust and a flat lower surface formed by a softer portion beneath said crust, said slicer comprising a frame, a table carried by said frame and provided with a cake receiving well that has an upright continuous peripheral cake confining wall, said table having a flat horizontal upper surface leading to the upper edge of said peripheral wall, a plurality of spaced flexible slicing blades extending inwardly from said peripheral wall and forming the bottom of said well, means engageable with the ends of the blades to hold the same in horizontal position and for adjusting the tension on said blades, a plunger mounted for vertical movement in said frame downwardly into and upwardly out of said well, said plunger being shaped to substantially fit within said well and having a concave bottom cake engaging face provided with spaced slots to receive said blades, said slots being of a depth greater than said blades to permit downward movement of said cake engaging face downwardly past said blades, said concave face being shaped to substantially conform to the convex upper surface of said cake and to engage said convex surface substantially throughout the extent thereof and between said blades, means for actuating said guiding plunger between an uppermost position clear of said well to a lowermost position in which the bottom face of the plunger is below said blades, said plunger when in said uppermost position being located above the top of said peripheral wall and the top of said table at a distance therefrom greater than the height of said cake so as to provide a laterally unobstructed cake receiving space above said well whereby said cake can slide laterally on the upper surface of said table to a position where it can drop into said well, and means carried by the frame for supporting a cake receiving tray in horizontal position beneath said blades at a distance therefrom only slightly greater than the height of said cake so that the flat bottom portion of said cake enters said tray immediately after the upper portion of said cake leaves said blades and the cutting of said cake is completed whereby the sliced cake is supported with its slices in upright position in said tray and is free to move laterally beneath said blades.

4. A cake cutter comprising a frame, a table carried by said frame and provided with a cake receiving well that has an upright continuous peripheral cake confining wall, said table having a flat horizontal upper surface leading to the upper edge of said peripheral wall, a series of radially disposed angularly spaced flexible slicing blades attached at their outer ends to said wall, a center post attached to the inner ends of said blades so as to be solely supported thereby, said center post having its uppermost surface below the top of said peripheral wall and a lowermost surface a short distance below said blades, means carried by said wall for adjusting the tension on said blades, a plunger mounted for vertical movement in said frame downwardly into and upwardly out of said well, said plunger being shaped to substantially fit within said well and having a cake engaging bottom face provided with radially disposed angularly spaced slots to receive said blades and a central recess to receive said post, said slots being of a depth greater than said blades to permit downward movement of said bottom face below said blades, means for reciprocating said plunger between an uppermost position clear of said well to a lowermost position in which the bottom face of the plunger is below said blades, said plunger when in said uppermost position being located above the top of said peripheral wall and said table at a distance therefrom greater than the height of a cake so as to provide a laterally unobstructed cake receiving space above said well whereby said cake can slide on the upper surface of said table laterally to a position where it can drop into said well, and a cake receiving support carried by said frame having a flat horizontal upper surface directly below said blades and said post and spaced therefrom a distance only slightly greater than the height of a cake forced through said cutters by said plunger so that the flat bottom portion of said cake rests upon the upper surface of said last mentioned support immediately after the upper portion of said cake leaves said blades and said cake is supported with its segments in upright position and is free to move laterally on said support.

References Cited in the file of this patent

UNITED STATES PATENTS

| Number | Name | Date |
|---|---|---|
| 925,693 | Goodykoontz et al. | June 22, 1909 |
| 1,146,085 | McVey | July 13, 1915 |
| 1,243,538 | Mattern | Oct. 16, 1917 |
| 1,286,796 | Schaffer | Dec. 3, 1918 |
| 1,399,950 | Fish | Dec. 13, 1921 |
| 2,015,409 | Pease | Sept. 24, 1935 |
| 2,035,259 | Brustowsky | Mar. 24, 1936 |
| 2,142,812 | Brustowsky | Jan. 3, 1939 |
| 2,280,059 | Brustowsky | Apr. 21, 1942 |
| 2,482,523 | Urschel et al. | Sept. 20, 1949 |
| 2,541,907 | Appling | Feb. 13, 1951 |

FOREIGN PATENTS

| Number | Country | Date |
|---|---|---|
| 416,790 | Germany | July 28, 1925 |
| 115,071 | Switzerland | Dec. 1, 1925 |
| 577,558 | Great Britain | May 22, 1946 |